United States Patent
Kung

(10) Patent No.: US 9,277,308 B2
(45) Date of Patent: Mar. 1, 2016

(54) SIGNAL RECEIVING STRUCTURE OF WIRELESS MICROPHONE

(71) Applicant: CHIAYO ELECTRONICS CO., LTD., Chiayi (TW)

(72) Inventor: Te-Wei Kung, Chiayi (TW)

(73) Assignee: Chiayo Electronics Co., Ltd., Chiayi (TW)

( * ) Notice: Subject to any disclaimer, the term of this patent is extended or adjusted under 35 U.S.C. 154(b) by 128 days.

(21) Appl. No.: 14/219,110

(22) Filed: Mar. 19, 2014

(65) Prior Publication Data

US 2014/0363017 A1    Dec. 11, 2014

(30) Foreign Application Priority Data

Jun. 7, 2013   (TW) .............................. 102120457 A

(51) Int. Cl.
| | |
|---|---|
| H04B 3/00 | (2006.01) |
| H04R 1/08 | (2006.01) |
| H04W 84/10 | (2009.01) |
| H04R 3/00 | (2006.01) |

(52) U.S. Cl.
CPC ................. *H04R 1/08* (2013.01); *H04W 84/10* (2013.01); *H04R 3/00* (2013.01)

(58) Field of Classification Search
None
See application file for complete search history.

(56) References Cited

U.S. PATENT DOCUMENTS

| | | | | |
|---|---|---|---|---|
| 2003/0157916 | A1* | 8/2003 | Kamimura | H04L 5/06 455/313 |
| 2004/0131201 | A1* | 7/2004 | Hundal | H04M 9/082 381/77 |
| 2010/0271983 | A1* | 10/2010 | Bryant | H04B 1/385 370/277 |
| 2011/0256830 | A1* | 10/2011 | Lee | H04M 1/6066 455/41.2 |
| 2012/0224713 | A1* | 9/2012 | Schmidt | H04B 1/76 381/77 |
| 2013/0090054 | A1* | 4/2013 | Bair | H04W 40/00 455/3.05 |
| 2014/0269951 | A1* | 9/2014 | Babarskas | H04B 3/542 375/257 |

* cited by examiner

*Primary Examiner* — Thang Tran
(74) *Attorney, Agent, or Firm* — Alan D. Kamrath; Kamrath IP Lawfirm, P.A.

(57) ABSTRACT

A signal receiving structure of a wireless microphone contains a host controlled by a RS485 and connecting with a plurality of RS485 receivers via plural signal cables. The signal receiving ranges of the plurality of RS485 receivers are overlapped to expand a total receiving range. Any one of the plurality of RS485 receivers transmits at least one microphone signal back to the host through a RS485 remote-control communication interface after receiving the at least one microphone signal. Power is supplied through the plural signal cables from the host, thus expanding the using range of at least one wireless microphone. At least one receiving module in the plurality of RS485 receivers receives the at least one microphone signal, acquires a strong one of the at least one microphone signal by using automatic selection, and outputs the strong one of the at least one microphone signal to the host.

2 Claims, 6 Drawing Sheets

SIGNAL RECEIVING STRUCTURE OF WIRELESS MICROPHONE

BACKGROUND OF THE INVENTION

1. Field of the Invention

The present invention relates to a signal receiving structure of a wireless microphone in which a host is controlled by a remote-control communication interface and connecting with a plurality of remote-control communication interface receivers, such that signal receiving ranges of the plurality of remote-control communication interface receivers are overlapped to expand a total receiving range.

2. Description of the Prior Art

A conventional microphone is a wireless microphone type or a wired microphone type. However, a wireless microphone and a wired microphone have respective defects. For instance, the wired microphone cannot be interfered, but its signal cable will limit its using range or may trip a user. The wireless microphone is used conveniently and can be moved widely, but it is interfered easily by frequencies, and a signal receiving distance of its receiver is limited, thus reducing its using range.

To improve the using range of the wireless microphone, the receiver of the wireless microphone is designed in a dual antenna type or is coupled with an exterior antenna to eliminate a dead angle of receiving signals. Further, a transmitting power of the wireless microphone is ruled by law and regulation. However, it is inevitable that an environmental dead angle (such as a partition or an environmental shelter) still exists to limit the transmitting power, thereby decreasing the using range.

The present invention has arisen to mitigate and/or obviate the afore-described disadvantages.

SUMMARY OF THE INVENTION

The primary objective of the present invention is to provide a signal receiving structure of a wireless microphone in which a host is controlled by a remote-control communication interface (such as a RS485) and connecting with a plurality of remote-control communication interface receivers, such that any one of the plurality of remote-control communication interface receivers transmits at least one microphone signal back to the host after receiving the at least one microphone signal, thus expanding using the range of at least one wireless microphone.

A signal receiving structure of a wireless microphone of the present invention contains a host connecting with a plurality of remote-control communication interface receivers. The plurality of remote-control communication interface receivers is arranged at different positions and is in connection with the host via plural signal cables. Signal receiving ranges of the plurality of remote-control communication interface receivers are overlapped to expand a total receiving range. For example, when a receiving distance between any two receivers is 100 m and an overlapping distance of the two receivers is 20 m, the total receiving distance is extended to 180 m. Thereafter, a strong one of the at least one microphone signal is selected automatically and outputted to the host, such that volumes and sound qualities outputted from the host are enhanced, thus solving environmental dead angle and short receiving distance defects. In addition, discontinuous sounds and noises are overcome.

The host matches with the plurality of remote-control communication interface receivers to control a remote communication, and each remote-control communication interface receiver is used at a low cost without amplifying power. Furthermore, the host can expand signal receiving ranges of the plurality of remote-control communication interface receivers.

The host not only can control and switch channels of the plurality of remote-control communication interface receivers, but also can transmit the at least one microphone signal to the host via the plural signal cables, thereby arranging the signal receiving structure of the wireless microphone easily.

DETAILED DESCRIPTION OF THE PREFERRED EMBODIMENTS

The present invention will be clearer from the following description when viewed together with the accompanying drawings, which show, for purpose of illustration only, a first embodiment in accordance with the present invention.

Figure 1:
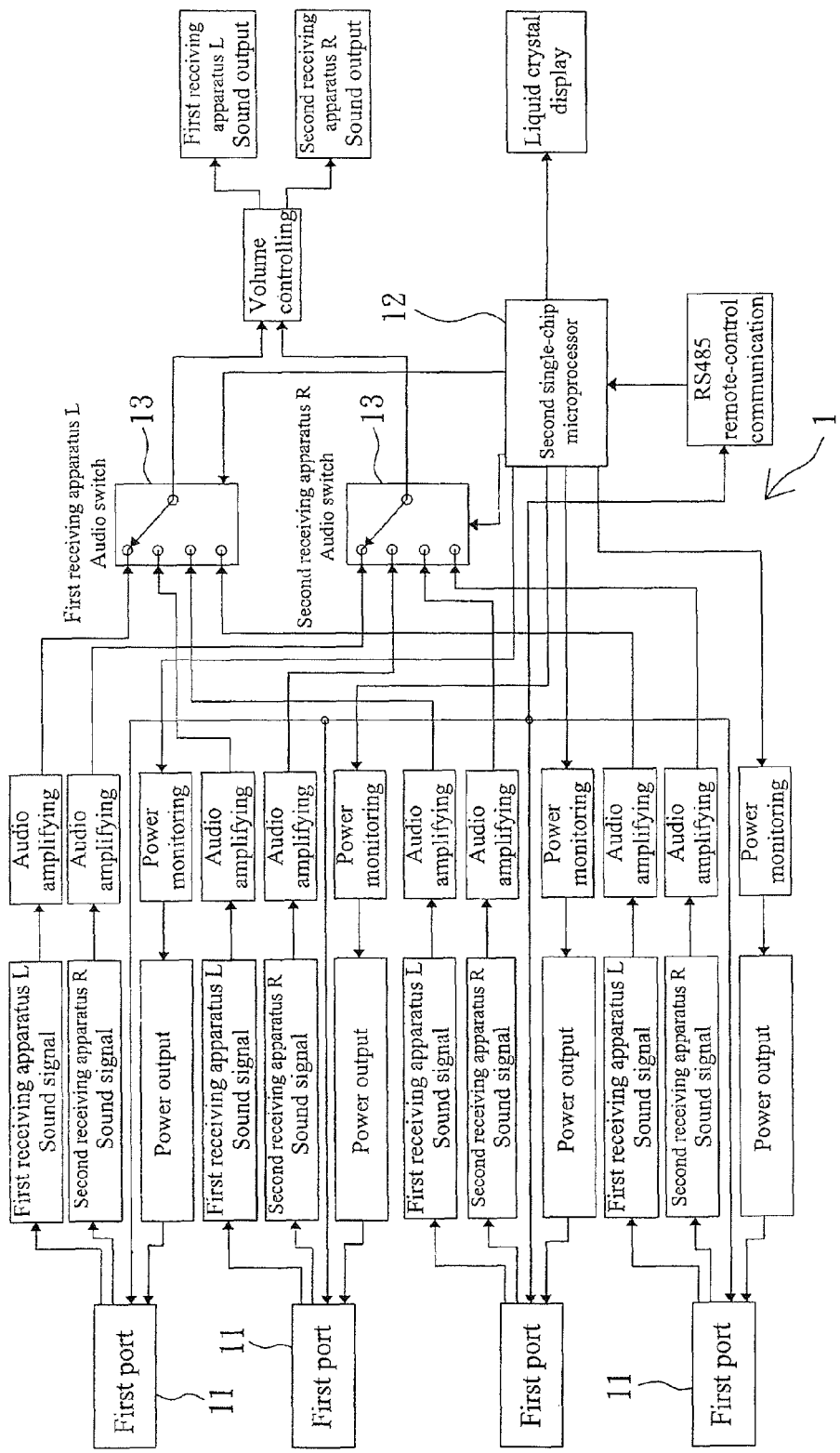
FIG. 1 is a block diagram of a signal receiving structure of a wireless microphone according to a preferred embodiment of the present invention.
Figure 2:
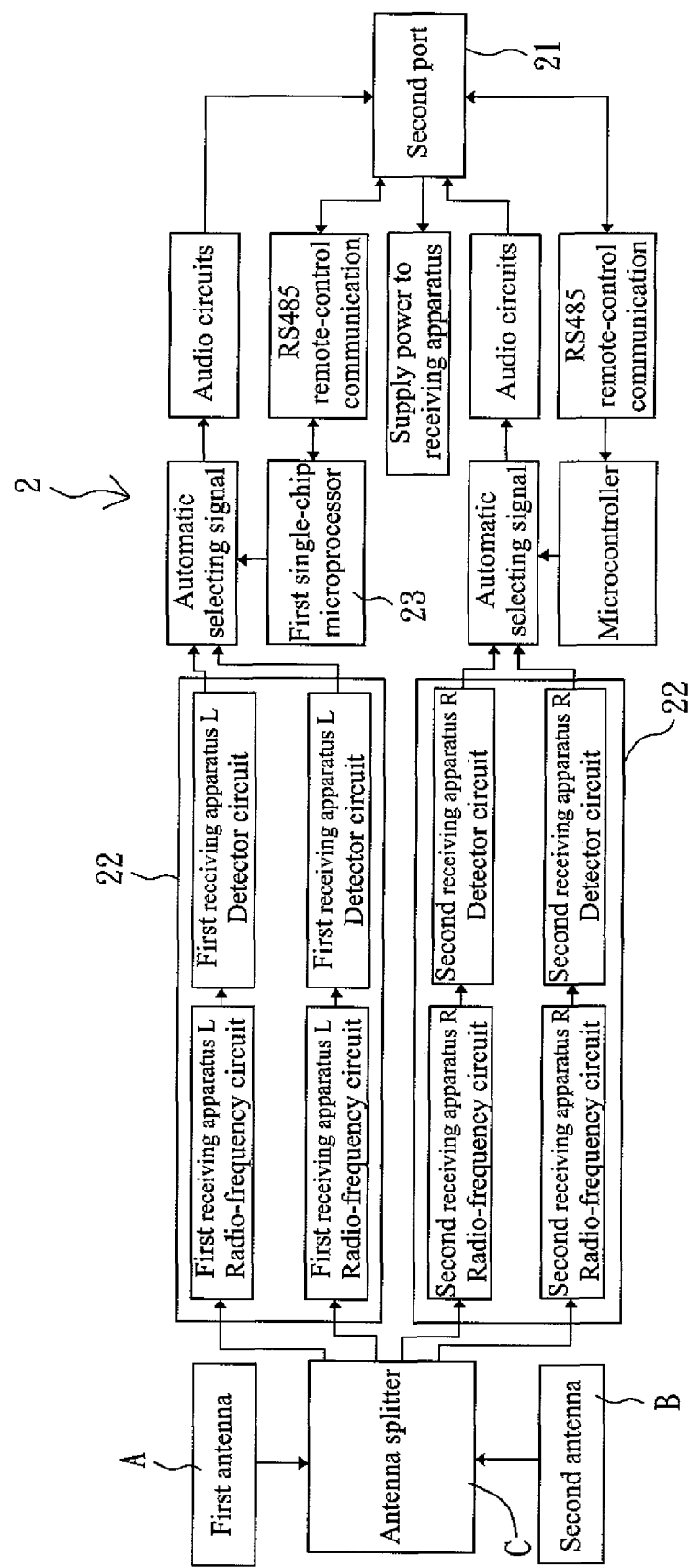
FIG. 2 is a block diagram of a remote-control communication interface receiver of the signal receiving structure of the wireless microphone according to the preferred embodiment of the present invention.
Figure 3:
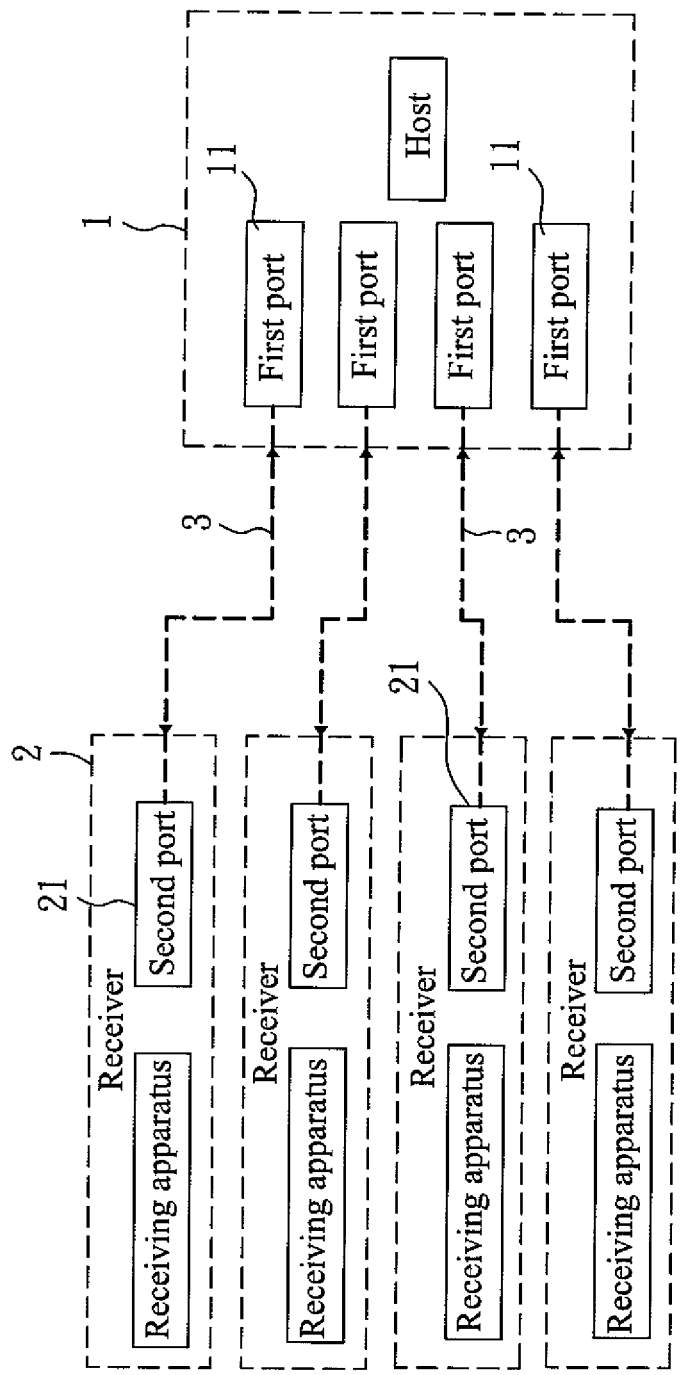
FIG. 3 is a block diagram showing the assembly of the signal receiving structure of the wireless microphone according to the preferred embodiment of the present invention.

With reference to FIGS. 1-3, a signal receiving structure of a wireless microphone according to a preferred embodiment of the present invention comprises: a host 1 controlled by a remote-control communication interface (such as a RS485) and connecting with a plurality of remote-control communication interface receivers 2 via a plural signal cables 3. Signal receiving ranges of the plurality of remote-control communication interface receivers 2 are overlapped to expand a total receiving range. Any one of the plurality of remote-control communication interface receivers 2 transmits at least one microphone signal back to the host 1 through the remote-control communication interface after receiving the at least one microphone signal, thus expanding using the range of at least one wireless microphone.

Each remote-control communication interface receiver 2 includes two receiving modules 22 (at least one first receiving apparatus L and at least one second receiving apparatus R) for receiving microphone signals of two wireless microphones by using a dual antenna formed by first and second antennas A and B via an antenna splitter C. The two receiving modules 22 receive the at least one microphone signal, acquire a strong one of the at least one microphone signal by way of automatic selection and output the strong one of the at least one microphone signal. Each receiving module 22 receives the at least one microphone signal, and the at least one microphone signal is filtered by radio-frequency circuit, wave mixed, and demodulated to form at least one sound signal and at least one voltage signal. The at least one voltage signal is transformed into at least one digital signal by a first single-chip microprocessor 23. At least one first port 11 and at least one second port 21 among the plurality of remote-control communication interface receivers 2 and the host 1 are connected by the plural signal cables 3. Each of the at least one first port 11 and the at least one second port 21 is a RJ45 access, and each signal cable 3 is an network cable. Hence, at least one microphone signal is transmitted through each signal cable 3, and the host 1 supplies power to the plurality of remote-control communication interface receivers 2. After the host 1 receives the at least one digital signal transmitted from the plurality of remote-control communication interface receivers 2 by ways of the remote-control communication interface, a second single-chip microprocessor 12 of the host 1 compares and selects one of the plurality of remote-control communication interface receivers 2 which transmits the strong one of the at least one microphone signal. At least one audio switch 13 selects the at least one sound signal of one of the plurality of remote-control communication interface receivers 2 automatically to output sounds from the host 1. Audio frequencies of the at least one sound signal are amplified by the host 1 and the at least one audio switch 13 to output the at least one sound signal (such as amplifying the sounds from a loudspeaker). The at least one microphone signal is transmitted back to the host 1 via the plurality of remote-control communication interface receivers 2 to output the sounds. The second single-chip microprocessor 12 of the host 1 transmits channels, frequencies and volumes to the plurality of remote-control communication interface receivers 2 via the remote-control communication interface to control and change the channels, the frequencies and the volumes of the plurality of remote-control communication interface receivers 2.

Figure 4:
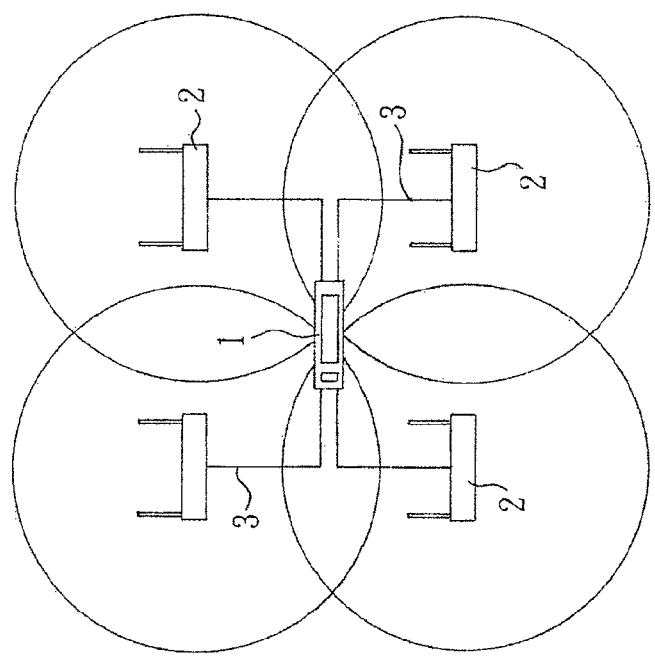
FIG. 4 is a plan view showing the operation of the signal receiving structure of the wireless microphone according to the preferred embodiment of the present invention.
Figure 5:
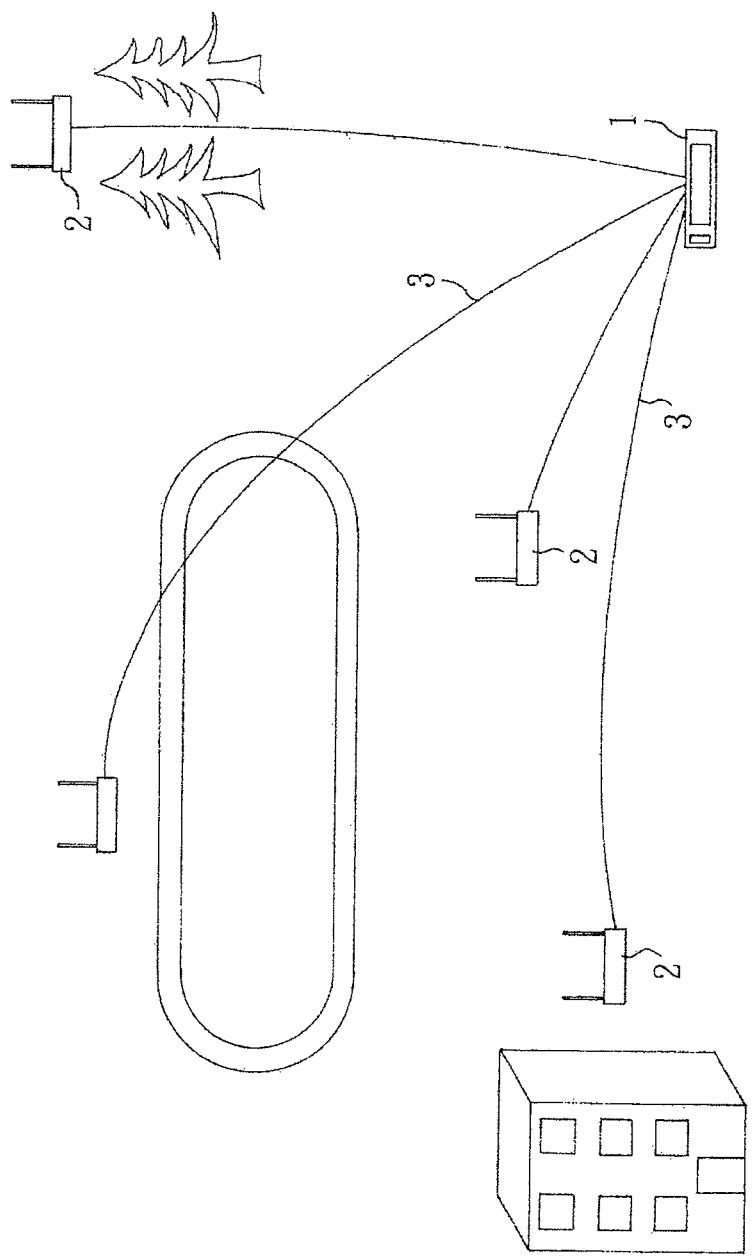
FIG. 5 is a perspective view showing the operation of the signal receiving structure of the wireless microphone according to the preferred embodiment of the present invention.
Figure 6:
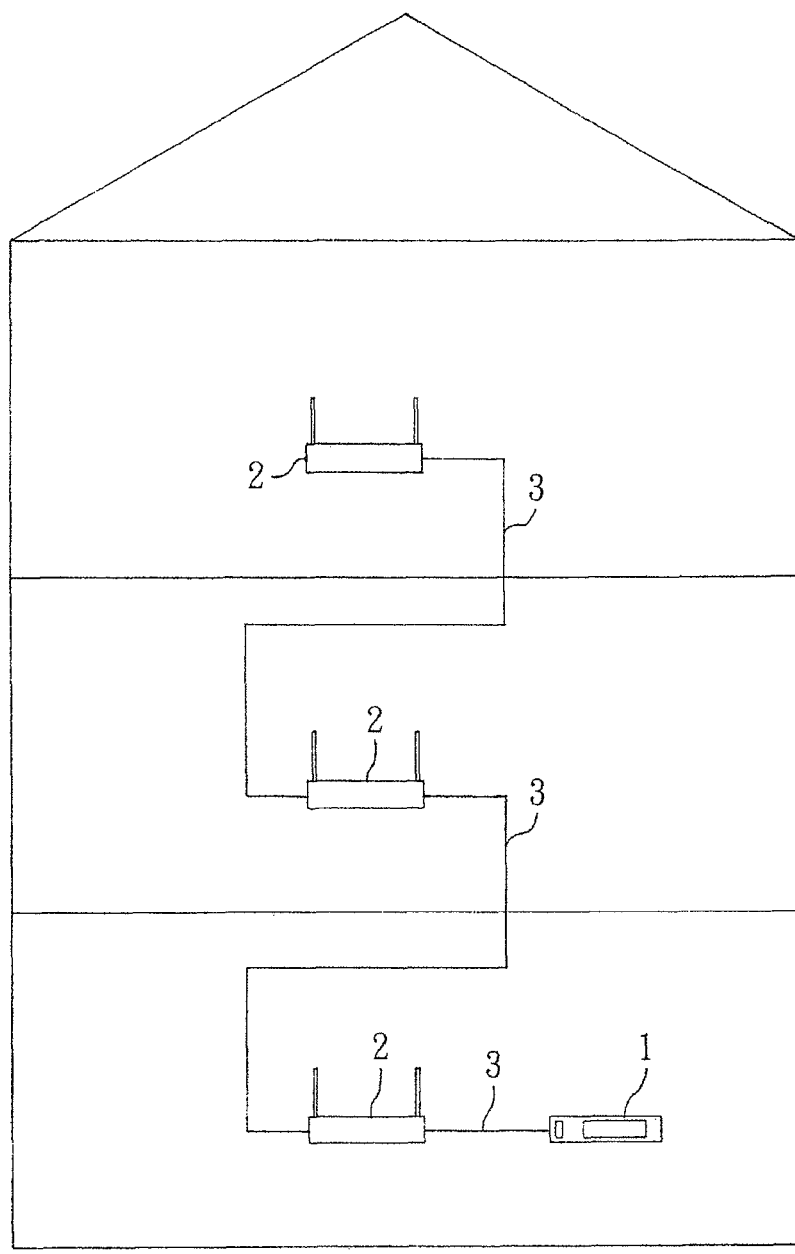
FIG. 6 is another plan view showing the operation of the signal receiving structure of the wireless microphone according to the preferred embodiment of the present invention.

The plurality of remote-control communication interface receivers 2 is arranged at different positions and is in connection with the host 1 via the plural signal cables 3 (or the plurality of remote-control communication interface receivers 2 is series connected by the plural signal cables 3 and then is coupled with the host 1). The signal receiving ranges of the plurality of remote-control communication interface receivers 2 are overlapped to expand the total receiving range. As shown in FIG. 4, for example, when a receiving distance between the host 1 and the first receiver is 100 m, and an overlapping distance of the two receivers is 20 m, the total receiving distance is extended to 180 m. Thereby, a user manually holds the wireless microphone and randomly walks within the signal receiving ranges of the plurality of remote-control communication interface receivers 2, and the at least one sound signal outputted from the at least one wireless microphone is received by the plurality of remote-control communication interface receivers 2 arranged at the different positions. Thereafter, the strong one of the at least one microphone signal is selected automatically and outputted to the host 1, such that the volumes and sound qualities outputted from the host 1 are enhanced, thus solving environmental dead angle and short receiving distance defects. In addition, discontinuous sounds and noises are overcome, so that the signal receiving structure of the wireless microphone is applicable for a large space (as illustrated in FIG. 5) and plural floors (as shown in FIG. 6).

While various embodiments in accordance with the present invention have been shown and described, it is clear to those skilled in the art that further embodiments may be made without departing from the scope of the present invention.

What is claimed is:

1. A signal receiving structure of a wireless microphone comprising:
    a host controlled by a RS485; and
    a plurality of RS485 receivers connected to the host via plural signal cables, wherein the plurality of RS485 receivers have signal receiving ranges which are overlapped to expand a total receiving range, wherein any one of the plurality of RS485 receivers transmits at least one microphone signal back to the host through RS485 remote-control communication interface after receiving the at least one microphone signal, and wherein power is supplied to the plurality of RS485 receivers via plural signal cables from the host, to expand a using range of at least one wireless microphone.

2. The signal receiving structure of the wireless microphone as claimed in claim 1, wherein at least one receiving module in the plurality of RS485 receivers receives the at least one microphone signal, acquires a strong one of the at least one microphone signal by way of automatic selection, and outputs the strong one of the at least one microphone signal to the host.

* * * * *